July 19, 1932.  B. S. FLORADAY  1,867,913
BRAKE MECHANISM
Filed April 1, 1927  3 Sheets-Sheet 1
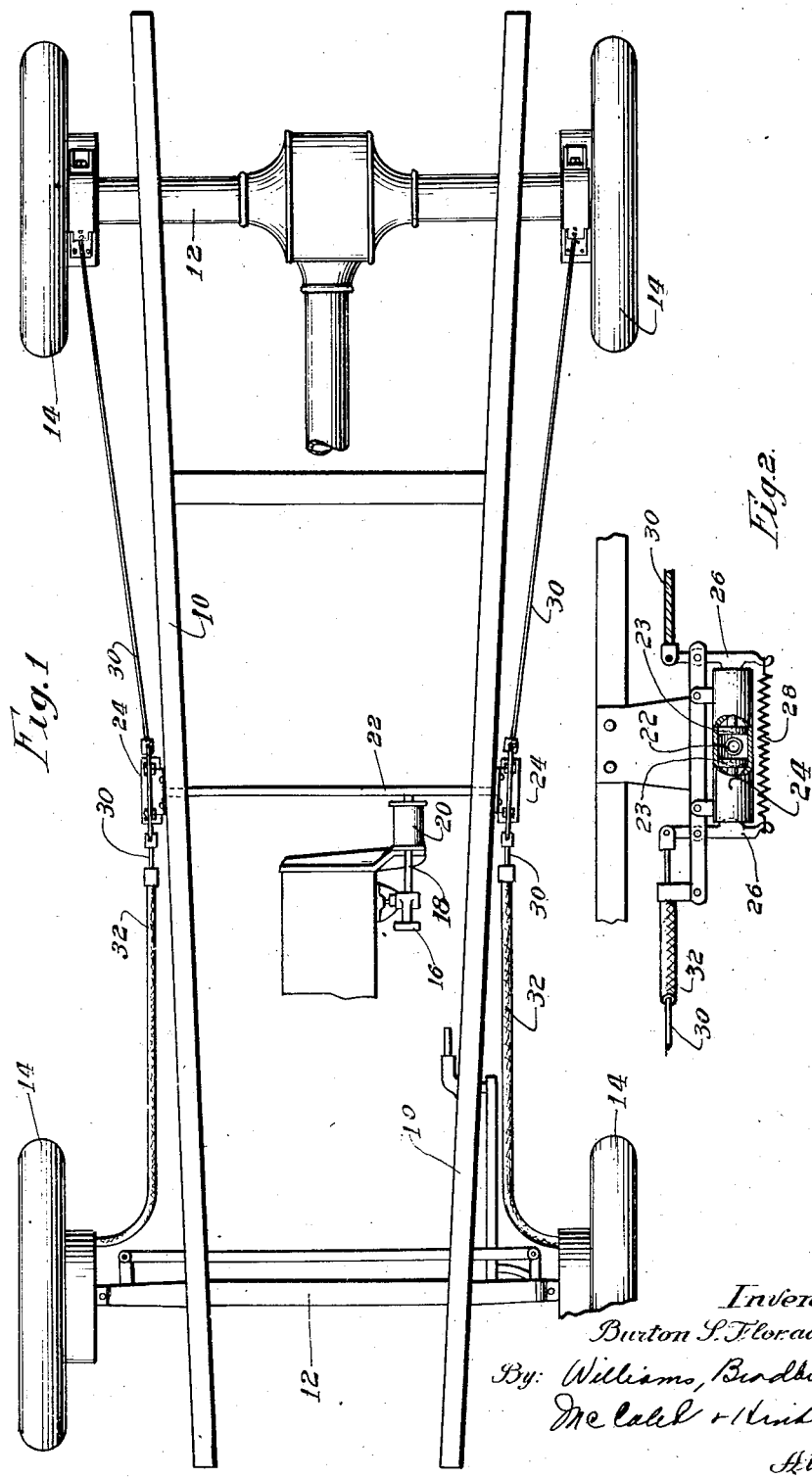

July 19, 1932.  B. S. FLORADAY  1,867,913
BRAKE MECHANISM
Filed April 1, 1927   3 Sheets-Sheet 2
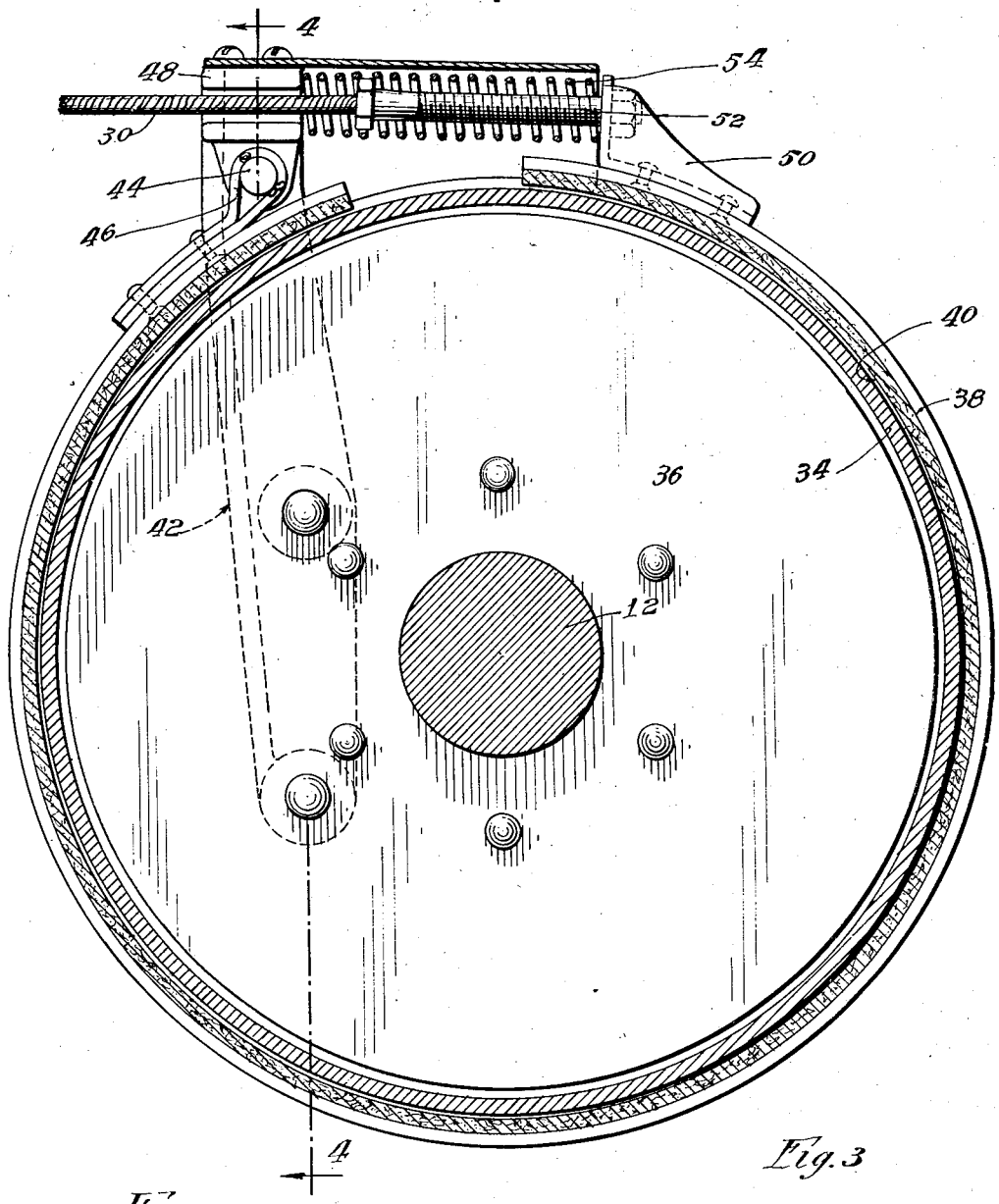
Fig. 3
Fig. 5
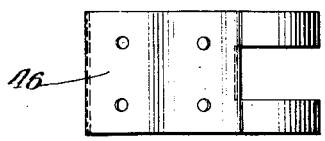
Inventor:
Burton S. Floraday
By: Williams, Bradbury,
McCaleb & Hinkle
Atty's.

Patented July 19, 1932

1,867,913

UNITED STATES PATENT OFFICE

BURTON S. FLORADAY, OF TOLEDO, OHIO, ASSIGNOR TO HYDRAULIC BRAKE COMPANY, OF DETROIT, MICHIGAN, A CORPORATION OF CALIFORNIA

BRAKE MECHANISM

Application filed April 1, 1927. Serial No. 180,101.

My invention relates to improvements in vehicle brake construction.

An object is to provide an improved brake for a road vehicle in which the brake band is brought into engagement with the brake drum in such a manner as to obtain the full braking effect thereof at any point during the application of the braking torque and notwithstanding wear of the contacting surface.

An important feature lies in the employment of an operating connection which at all times exerts a pressure upon the brake band in a direction tangential to the contacting surface of the brake drum.

It is common practice to make use of coupling connections such as levers and cams to transmit the pressure from the brake cable to the brake band. Due to the angular movement of such coupling connections as the brake band is drawn into contact with the drum the direction of application of force changes during its application.

Through the use of my improved structure a connection is made by the cable directly with the brake band in a line tangential to the drum and the band is wrapped all the way about the drum and the force exerted upon the band is at all times substantially in the same line.

Other advantages and meritorious objects of my invention will appear from the following specification, appended claim and accompanying drawings, in which:

Figure 1 is a plan of a vehicle chassis provided with my invention.

Figure 2 is a side elevation of a portion of the operating mechanism.

Figure 3 is a vertical sectional view through my improved brake structure.

Figure 5 is an elevation of a sheet metal eye terminal for the respective ends of the brake bands.

Figure 4:
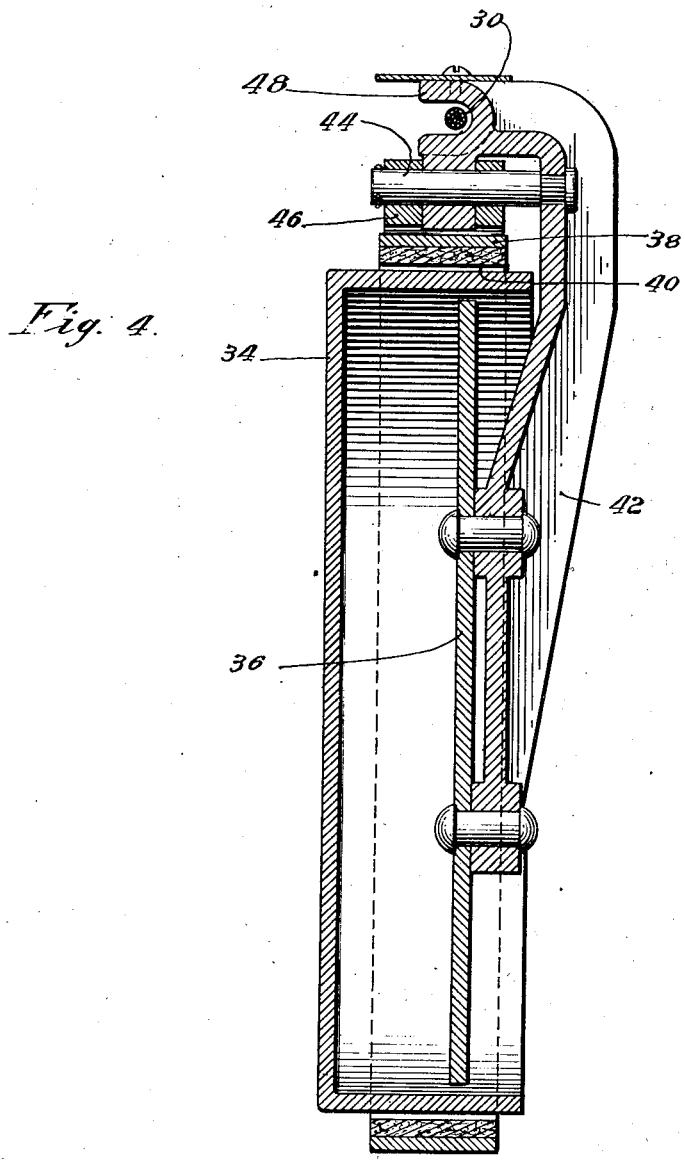
Figure 4 is a cross-sectional view taken on line 4—4, Figure 3.

In the drawings, the side frame members 10 of a vehicle chassis provided with axles 12 having road wheels 14, each of which is here shown as provided with a brake. A brake pedal 16 which operates a plunger 18 to create a fluid pressure in a cylinder 20 which communicates through conduit 22 with a pair of fluid pressure cylinders 24, one on each side of the vehicle chassis between the pair of road wheels on such side. A pair of opposed pistons 23 are mounted within each cylinder 24. The pressure created therein upon depression of the brake pedal forces the pistons outwardly to operate the swinging arms 26 and thereby to exert a tension upon the brake cables 30. The arms 26 are thus moved against the force of retractile springs 28. The brake cables 30 extending to the brakes of the front wheels pass through flexible conduits 32. Those extending to the brakes of the rear wheels require no conduit.

Referring to Figures 3 and 4, in my invention the road wheel is provided with the usual brake drum 34, a brake carrier in the form of a plate 36 mounted upon the axle and a brake band 38 which has a frictional face 40. This band is here shown as a full wrapped band extending substantially completely about the drum. It is anchored by a bracket 42 to the brake carrier. The bracket 42 carries an anchor pin 44; and a looped strap 46 is secured on the end of brake band and through the eye of which the anchor pin extends. The bracket 42 has a guide portion 48 which extends upwardly above the pin 44. The opposite end of the band is free to wrap about the drum on its rotation. It carries an end fitting 50 embodying a socket member 52 that is secured to the end of the cable 30. A spring 54 is interposed between the member 50 and the bracket 42 so as to hold the band normally in the expanded position.

It will be seen that the force exerted by the cable upon the band is a direct tangential force. It is not transmitted through the use of the usual coupling lever mechanism, but the cable is connected directly with the band. The cable extends in a line tangential to the drum so that the force exerted upon the band to apply its braking torque is a force tangential to the drum, and this remains true throughout the application of such force. The cable does not change its angular position during the application of the force it exerts upon the band. The band, therefore, is drawn evenly about the drum and its application thereto is substantially uniform; that is, there is no variable leverage.

Certain features disclosed but not claimed herein are claimed in my copending applications, Serial Nos. 97,207 and 180,102, filed March 25, 1926, and April 1, 1927, respectively. The former application claims cable-operated brake mechanism, and the latter application claims the combination of the hydraulic and mechanical brake operating mechanism.

What I claim is:

A vehicle brake comprising a rotatable drum, a fixedly mounted bracket formed with a forked end overlying the periphery of said drum, said forked end having a depending bearing portion, a bearing pin affixed at one end to said bracket and adapted to extend through said depending bearing portion, a brake band encircling said drum and having at one of its ends a bifurcated looped portion for pivotally receiving said bearing pin thereby to anchor said end of the brake band, a flexible cable attached to the opposite end of said brake band and received within the said forked end of the bracket thereby to guide it, a casing secured to said forked end of the bracket and extending toward the movable end of said brake band, and a spring shielded by said casing and surrounding said flexible cable to separate the ends of the brake band and thereby normally to disengage the brake elements.

In witness whereof, I hereunto subscribe my name this 25th day of March, 1927.

BURTON S. FLORADAY.